United States Patent
Ohtaki

(12) 
(10) Patent No.: US 6,925,294 B2
(45) Date of Patent: Aug. 2, 2005

(54) ANTENNA RECEIVER IN WHICH CARRIER-TO-NOISE RATIO OF DEMODULATION SIGNAL IS IMPROVED

(75) Inventor: Yukio Ohtaki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 415 days.

(21) Appl. No.: 10/188,707

(22) Filed: Jul. 2, 2002

(65) Prior Publication Data

US 2003/0008630 A1 Jan. 9, 2003

(30) Foreign Application Priority Data

Jul. 5, 2001 (JP) ........................................ 2001-204864

(51) Int. Cl.[7] .............................................. H04B 1/26
(52) U.S. Cl. ...................... 455/323; 455/260; 375/327
(58) Field of Search ................................ 455/255, 259, 455/260, 272, 273, 275, 276.1, 313, 315, 318, 323, 334; 375/316, 324, 327, 344, 354

(56) References Cited

U.S. PATENT DOCUMENTS

| | | | |
|---|---|---|---|
| 4,261,056 A | | 4/1981 | Barnett et al. |
| 4,406,017 A | | 9/1983 | Takahashi |
| 5,345,602 A | | 9/1994 | Wiedemann et al. |
| 5,712,642 A | | 1/1998 | Hulderman |
| 5,857,004 A | * | 1/1999 | Abe ........................... 375/344 |
| 6,728,517 B2 | * | 4/2004 | Sugar et al. ................. 455/272 |

FOREIGN PATENT DOCUMENTS

| | | |
|---|---|---|
| EP | 0 438 309 | 7/1991 |
| EP | 0 546 806 | 6/1993 |
| JP | 8-162834 | 6/1996 |
| JP | 10-224138 | 8/1998 |

OTHER PUBLICATIONS

Curtis C. Ling and Zhang Chunning, "Low–Complexity Antenna Diversity Receivers for Mobile Wireless Applications", pp. 65–81, Wireless Personal Computers, 2000.

"A Technical Tutorial on Digital Signal Synthesis", XP–002216372, Analog Devices, Inc., 1999.

R.S. Varnes, J.A.R. Ball, N.H. Hancock, A Dual–Output, Coherent Signal Generator Using Direct Digital Synthesis, IEEE Instrumentation and Measurement Technology, pp., 1299–1304, May 19–21, 1997.

* cited by examiner

Primary Examiner—Quochien B. Vuong
(74) Attorney, Agent, or Firm—Brinks Hofer Gilson & Lione

(57) ABSTRACT

An antenna receiver includes a plurality of mixers for frequency-converting signals received by a plurality of antennas into intermediate-frequency signals; a plurality of local oscillators, which correspond to the plurality of mixers and which supply local oscillation signals having the same frequency to the mixers; a plurality of PLL circuits, which correspond to the plurality of local oscillators and which set the frequency of the local oscillation signals; and an adder for adding the intermediate-frequency signals output from the mixers. The phases of reference signals supplied to the PLL circuits can be changed independently from each other.

3 Claims, 3 Drawing Sheets

ANTENNA RECEIVER IN WHICH CARRIER-TO-NOISE RATIO OF DEMODULATION SIGNAL IS IMPROVED

This application claims the benefit of priority to Japanese Patent Application 2001-204864, filed on Jul. 5, 2001.

BACKGROUND OF THE INVENTION

1. Field of the Invention

The present invention relates to an antenna receiver which can obtain satisfactory reception by combining signals received by a plurality of antennas, such as a diversity receiver or an adaptive antenna receiver of a base station.

2. Description of the Related Art

FIG. 3 shows the configuration of a known antenna receiver. Signals received by a plurality of (in this case, three) antennas 41, 42, and 43, which are placed with a certain distance therebetween, are amplified by amplifiers 44, 45, and 46, and are then frequency-converted to intermediate-frequency signals by mixers 47, 48, and 49, respectively. A local oscillation signal output from a local oscillator 50 is input to each of the mixers 47, 48, and 49 through phase shifters 51, 52, and 53 respectively. Thus, the phase of the intermediate-frequency signal output from each of the mixers 47, 48, and 49 varies in accordance with the phase of the local oscillation signal set by each of the phase shifters 51, 52, and 53.

Each of the intermediate-frequency signals is input to an adder 57 through band-pass filters 54, 55, and 56, respectively. The adder 57 adds the intermediate-frequency signals. The added intermediate-frequency signal is then demodulated by a demodulating circuit 58.

Herein, if the phases of the intermediate-frequency signals output from the band-pass filters 54, 55, and 56 are the same as each other, the power of the intermediate-frequency signal output from the adder 57 is maximized, and thus a demodulation signal having a sufficient amplitude can be obtained from the demodulating circuit 58. In order to maximize the amplitude of the demodulation signal, the demodulating circuit 58 controls and sets the phase of each of the phase shifters 51, 52, and 53 so that the power of the intermediate-frequency signal is maximized.

When an antenna receiver having the above-described configuration is applied to a system having many channels, such as a mobile phone, the local oscillator 50 needs to oscillate with a frequency according to each channel. Therefore, each of the phase shifters 51, 52, and 53 is required to have a broadband characteristic so that the phase can be changed over a wide frequency band. However, this involves higher costs.

Also, since the frequency of a local oscillation signal is often high, frequency loss is caused by providing lines for inputting the local oscillation signals to the mixers 47, 48, and 49 and by inserting the phase shifters 51, 52, and 53. As a result, the carrier-to-noise (C/N) ratio of the modulation signal deteriorates.

SUMMARY OF THE INVENTION

Accordingly, it is an object of the present invention to improve the C/N ratio of a demodulation signal by using an inexpensive phase shifter for changing the phase of a single frequency.

In order to solve the above-described problems, an antenna receiver of the present invention comprises a plurality of mixers for frequency-converting signals received by a plurality of antennas into intermediate-frequency signals; a plurality of local oscillators, which correspond to the plurality of mixers and which supply local oscillation signals having the same frequency to the mixers; a plurality of PLL circuits, which correspond to the plurality of local oscillators and which set the frequency of the local oscillation signals; and an adder for adding the intermediate-frequency signals output from the mixers. The phases of reference signals supplied to the PLL circuits can be changed independently from each other.

With this arrangement, the phase shifters need to change only the phases of the single-frequency reference signals having a low frequency. Accordingly, the phase shifter can be configured by an inductance element and a capacitance element and so on, with a low cost. Further, the low frequency of the reference signals contributes to reduce losses caused by inserting the phase shifters and providing a wiring, and thus the C/N ratio of the demodulation signal is improved.

The antenna receiver may further comprise a reference signal source for generating the reference signals and a plurality of phase shifters provided between the reference signal source and the PLL circuits. The phases of the reference signals can be changed by the phase shifters. Accordingly, the phases of the oscillation signals from the plurality of local oscillators can be changed by using one reference signal source.

Preferably, the antenna receiver further comprises a plurality of digital synthesizers for generating the reference signals which are supplied to the PLL circuits. Phase data to be input to each of the digital synthesizers can be individually changed. With this arrangement, the frequency and phase of the reference signals can be easily set digitally.

DESCRIPTION OF THE PREFERRED EMBODIMENTS

Figure 1:
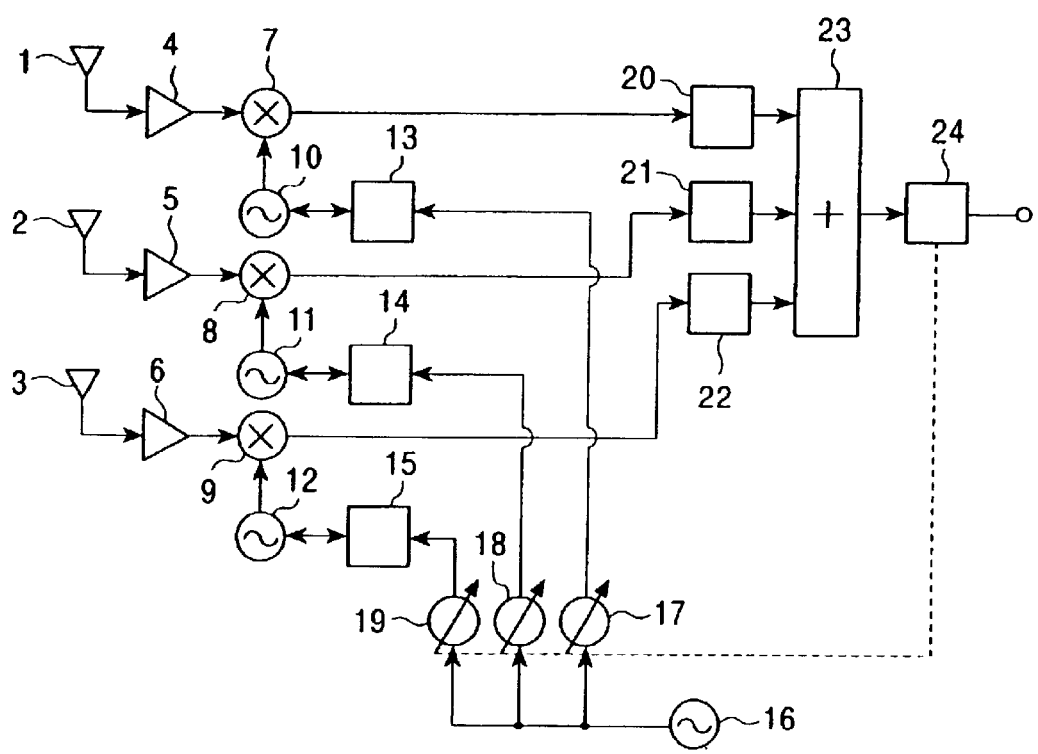
FIG. 1 is a circuit diagram of an antenna receiver of the present invention.

FIG. 1 shows the configuration of an antenna receiver of the present invention. Signals received by a plurality of (in this case, three) antennas 1, 2, and 3, which are placed with a certain distance therebetween, are amplified by amplifiers 4, 5, and 6, and then are frequency-converted to intermediate-frequency signals by mixers 7, 8, and 9, respectively. Local oscillation signals output from local oscillators 10, 11, and 12 are input to the mixers 7, 8, and 9 respectively. Also, the frequencies of the local oscillation signals output from the local oscillators 10, 11, and 12 are set by corresponding PLL circuits 13, 14, and 15. Each of the PLL circuits 13, 14, and 15 receives common frequency data and reference signal for setting the local oscillation frequency. However, the frequency data is not shown.

The reference signal is generated at a reference signal source 16 and is input to each of the PLL circuits 13, 14, and 15 through phase shifters 17, 18, and 19, respectively. Accordingly, the phases of the intermediate-frequency signals output from the mixers 7, 8, and 9 vary in accordance with the phases of the local oscillation signals output from the local oscillators 10, 11, and 12, respectively. Also, the phases of the oscillation signals vary in accordance with the phases of reference signals input to the PLL circuits 13, 14, and 15.

Each of the intermediate-frequency signals is input to an adder 23 through band-pass filters 20, 21, and 22, respectively. The adder 23 adds the intermediate-frequency signals. The added intermediate frequency signal is demodulated by a demodulating circuit 24.

Herein, if the phases of the intermediate frequency signals input to the adder 23 are the same as each other, the power of the added intermediate-frequency signal output from the adder 23 is maximized, and thus a demodulation signal having a sufficient amplitude can be obtained from the demodulating circuit 24. In order to maximize the amplitude of the demodulation signal, the phase shifters 17, 18, and 19 are controlled so that the phase of the reference signal input to each of the PLL circuits 13, 14, and 15 is set. This is because the phase of the intermediate-frequency signal depends on the phase of the reference signal.

Accordingly, in the present invention, the demodulating circuit 24 controls the phase shifters 17, 18, and 19. The demodulating circuit 24 includes a detecting unit (not shown) for detecting the amplitude (or power) of the input intermediate-frequency signal or the modulation signal and a phase-controlling unit (not shown) for controlling the phase shifters 17, 18, and 19. The phase-controlling unit changes relative phases set in the phase shifters 17, 18, and 19 by a predetermined step so as to detect the amplitude of the modulation signal at that time. Then, a relative phase is set when the amplitude is maximized.

In the above-described configuration, the reference signals, whose phase is changed by the phase shifters 17, 18, and 19, are single-frequency signals having a frequency which is lower than the local oscillation frequency. Therefore, the phase shifters 17, 18, and 19 can be realized with a simple configuration having, for example, an inductance element and a capacitance element.

Incidentally, the antenna receiver of the present invention can be realized by using a plurality of digital synthesizers instead of the above-described reference signal source 16 and the phase shifters 17, 18, and 19. Hereinafter, the digital synthesizers will be briefly described.

Figure 2:
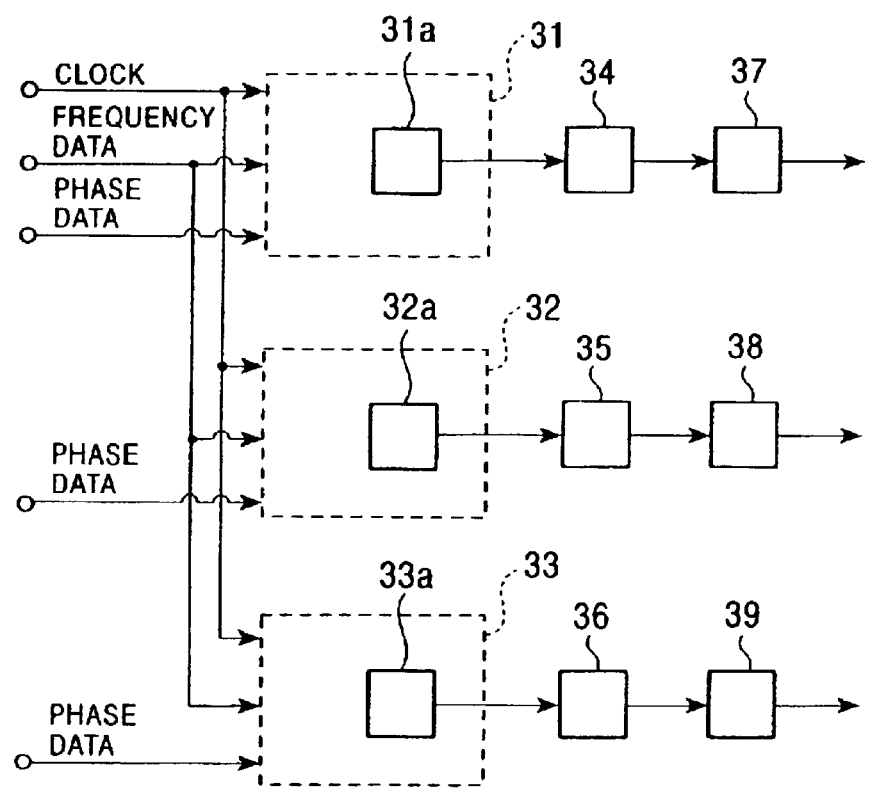
FIG. 2 is a circuit diagram in which digital synthesizers generate reference signals used in the antenna receiver of the present invention.
Figure 3:
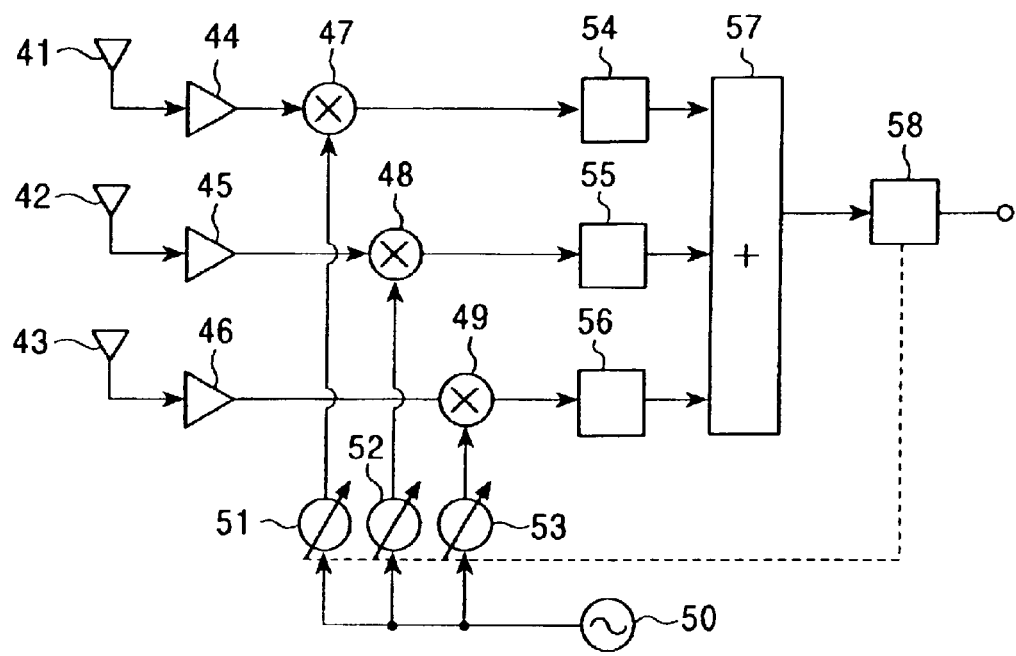
FIG. 3 is a circuit diagram of a known antenna receiver.

FIG. 2 shows a configuration for generating reference signals by using digital synthesizers. The digital synthesizers 31, 32, and 33 include ROMs 31*a*, 32*a*, and 33*a* respectively. Each of the ROMs 31*a*, 32*a*, and 33*a* stores data for one-period of a sine wave, in which the amplitude and phase are discrete. A common clock and frequency data are input to each of the digital synthesizers 31, 32, and 33, and each of the ROMs 31*a*, 32*a*, and 33*a* generates sine wave data which is synchronized with the clock and which has the same frequency.

Further, individual phase data is input to each of the digital synthesizers 31, 32, and 33. The phase of the sine wave data is determined depending on the phase data. The phase is set by the demodulating circuit. The sine wave data output from each of the ROMs 31*a*, 32*a*, and 33*a* is converted to an analog sine wave by D/A converters 34, 35, and 36, respectively. The analog sine waves are input to the PLL circuits 13, 14, and 15 through band-pass filters 37, 38, and 39 respectively, as reference signals.

As described above, by using the digital synthesizers, the frequency and phase of the reference signal can be easily set digitally.

What is claimed is:

1. An antenna receiver comprising:
   a plurality of mixers that frequency-converts signals received by a plurality of antennas into intermediate-frequency signals;
   a plurality of local oscillators, which correspond to the plurality of mixers and which supply local oscillation signals having the same frequency to the mixers;
   a plurality of PLL circuits, which correspond to the plurality of local oscillators and which set the frequency of the local oscillation signals; and
   an adder that adds the intermediate-frequency signals output from the mixers,
   wherein phases of reference signals supplied to the PLL circuits are independently changeable from each other.

2. The antenna receiver according to claim 1, further comprising:
   a reference signal source that generates the reference signals; and
   a plurality of phase shifters provided between the reference signal source and the PLL circuits,
   wherein the phases at the reference signals are changeable by the phase shifters.

3. The antenna receiver according to claim 1, further comprising a plurality of digital synthesizers that generate the reference signals which are supplied to the PLL circuits, wherein phase data to be input to each of the digital synthesizers are individually changeable.

* * * * *

UNITED STATES PATENT AND TRADEMARK OFFICE
CERTIFICATE OF CORRECTION

PATENT NO. : 6,925,294 B2
DATED : August 2, 2005
INVENTOR(S) : Yukio Ohtaki

It is certified that error appears in the above-identified patent and that said Letters Patent is hereby corrected as shown below:

Column 4,
Line 40, after "phases" delete "at the" and substitute -- of the -- in its place.

Signed and Sealed this

Twenty-second Day of November, 2005

JON W. DUDAS
*Director of the United States Patent and Trademark Office*